United States Patent [19]

Okuda et al.

[11] 4,214,141

[45] Jul. 22, 1980

[54] MULTIPLE ELECTRODE SUBMERGED ARC WELDING METHOD

[75] Inventors: Naoki Okuda, Kamakura; Akira Nakano, Hiratsuka, both of Japan

[73] Assignee: Kobe Steel, Ltd., Kobe, Japan

[21] Appl. No.: 974,546

[22] Filed: Dec. 29, 1978

[30] Foreign Application Priority Data

Dec. 29, 1977 [JP] Japan ................................. 52/160428
Dec. 29, 1977 [JP] Japan ................................. 52/160429
Aug. 21, 1978 [JP] Japan ................................. 53/102156

[51] Int. Cl.$^2$ .............................................. B23K 9/18
[52] U.S. Cl. ........................................ 219/73; 148/26; 219/137 R
[58] Field of Search ........................ 219/73 R, 137 R; 148/26

[56] References Cited

U.S. PATENT DOCUMENTS

| 2,550,641 | 4/1951 | Harter | 219/73 R |
| 2,620,423 | 12/1952 | Komers | 219/73 R |
| 3,192,079 | 6/1965 | Takagi | 219/73 R X |
| 3,424,626 | 1/1969 | Coless | 148/26 |
| 3,513,283 | 5/1970 | Arnoldy | 219/73 R |
| 3,704,358 | 11/1972 | Saito | 219/73 R |
| 3,885,123 | 5/1975 | Sciaky | 219/137 X |

FOREIGN PATENT DOCUMENTS

42-24810 11/1967 Japan .......................................... 219/73

Primary Examiner—Richard R. Kucia
Attorney, Agent, or Firm—Oblon, Fisher, Spivak, McClelland & Maier

[57] ABSTRACT

A submerged arc welding method and more specifically, a multiple electrode welding method is disclosed wherein welding is performed by arranging electrodes in such a manner that the distance becomes at least 300 mm between a first molten pool formed by multilayer welding or by a single or plural electrodes preceding along the weld line and a subsequent molten pool formed by a single subsequent electrode or plural subsequent electrodes, as well as a submerged arc welding method which is characterized in that there is formed a slag having the components listed below on the weld metal formed by an electrode or a preceding electrode forming a preceding layer, and welding is carried out as such, without removing the slag, using an electrode or a subsequent electrode forming a subsequent layer;

$TiO_2$: 20-65% by weight (up to 60% by weight, based on the total $TiO_2$ amount, of which may be substituted by $ZrO_2$);
$CaF_2$: 9.6-40% by weight, and
$Al_2O_3$: 10-56% by weight.

11 Claims, 12 Drawing Figures

MULTIPLE ELECTRODE SUBMERGED ARC WELDING METHOD

BACKGROUND OF THE INVENTION (1) Field of the Invention

This invention relates to a multiple electrode submerged arc welding method and more particularly to a submerged arc welding method capable of drastically increasing the welding efficiency.

(2) Description of the Prior Art

The submerged arc welding method is a method in which the welding is carried out while the atmosphere of the arc is seated by a flux and hence, can use a greater welding current in comparison with a MIG welding method. Its current density can also be enhanced by several times higher than that in manual welding. In addition, since the fusing speed of the wire and the depth of penetration can also be increased markedly, the method has the advantage that welding can be accomplished for a material having a considerably large thickness. On the contrary, however, the submerged arc welding method is not free from the disadvantage that since the value of current to be used is high, heat input applied to a material to be weld is large and the range of embrittlement tends to increase along with expansion of the heat affected zone. When the submerged arc welding method is employed for a structure for which low temperature toughness or the like is a requisite, therefore, it has been a customary practice in the art to employ a multi-layer build-up welding method in order to disperse heat input and to narrow the heat affected zone of the base metal.

In other words, since this method enables reduction of the heat input applied temporarily to the material to be welded, the cooling speed is rapid at the weld section and the heat affected zone thus be narrowed. In addition, because the coarse ferrite structure formed in the preceeding weld metal and in the heat affected zone can be refined by the arc heat applied at the time of the formation of a subsequent layer, this method is advantageous also for the purpose of enhancing the low temperature toughness of the heat affected zone itself. In this instance, it is also possible to enhance the toughness of the weld metal itself by admixing proper amounts of alloy components from a powder flux or from a wire. According to this method, however, the number of passes must be increased so as to restrain the heat input per layer at a low level so that removal of slag, which is formed on the bead surface per pass, becomes extremely troublesome and time-consuming, thus resulting inevitably in the lowering of the welding efficiency. If the groove angle is narrowed in order to reduce the number of passes, removal of the slag for the first or second layer becomes all the more difficult and the object of improving the efficiency can not be accomplished.

Removal of the slag by peeling is an essential requirement for, even if welding is attempted onto the slag without removing the same, no arc would be generated and welding itself would then not be feasible because the slag layer, which has hardened and lost its conductivity, functions as a resistor. Removal of the slag per layer could be eliminated and the efficiency of the welding work could be enhanced if a multiple electrode welding method is employed in which arc an is generated from a subsequent electrode while the slag at the preceding weld section still remains molten or semi-molten (that is, in the state where the slag still maintains its conductivity). In this case, however, the distance between the preceding electrode and the subsequent electrode must be shortened so that the distance between the preceding molten pool and the subsequent molten pool becomes so small as to be inevitably adjacent to each other whereby the effect of dispersion of the welding heat input is reduced. Thus, it becomes impossible to accomplish the original aims of reducing the heat affected zone and preventing the growth of the coarse ferrite structure, and to obtain satisfactory low temperature toughness.

With the background as described above, the inventors of the present invention have conceived that the most ideal welding method would be one that enables altogether eliminating removal of the slag, diminishing the heat affected zone and preventing growth of the coarse ferrite structure (improvement of the low temperature toughness) simultaneously in a multilayer build-up welding or a multiple electrode welding in accordance with the submerged arc welding method, and have made intensive studies in search for such welding method that would provide enormous practical advantages. As a results, the inventors of the present invention have come to believe that these objects can be accomplished by furnishing the hardened slag layer with such conductivity so as to allow the generation of arc. Thus, the present invention is completed on the basis of the abovementioned concept.

SUMMARY OF THE INVENTION

Therefore, the first object of the present invention is to provide a submerged arc welding method which enables simultaneous elimination of the peel-off and removal of slag, to diminish the heat affected zone and to prevent growth of the coarse ferrite structure (improvement of low temperature toughness) in practicing the multi-layer build-up welding or multiple electrode welding.

The second object of the present invention is to provide a high efficiency, multiple electrode, one-side submerged arc welding method which provides a weld bond of a joint having excellent low temperature toughness.

In a multiple electrode welding method wherein welding is performed by arranging electrodes in such a manner that the distance becomes at least 300 mm between a first molten pool formed by multilayer welding or by a single or plural electrode preceding along the weld line and a subsequent molten pool formed by a single subsequent electrode or plural subsequent electrodes, the first embodiment of the present invention for accomplishing these and other objects thereof pertains to a submerged arc welding method which is characterized in that there is formed a slag having the components listed below on the weld metal formed by at least one preceding electrode forming a preceding layer, and welding is carried out as such, without removing the slag, using an electrode or subsequent electrodes forming a subsequent layer;

$TiO_2$: 20–65% by weight (up to 60% by weight, based on the total $TiO_2$ amount, of which may be substituted by $ZrO_2$), $CaF_2$: 9.6–40% by weight, and $Al_2O_3$: 10–56% by weight.

In comparison with the first embodiment described above, the second embodiment of the present invention relates to a submerged arc welding method wherein the total of said three components, i.e., TiO$_2$, CaF$_2$ and Al$_2$O$_3$ accounts for 60-90% by weight of the whole slag forming agent.

In comparison with the first embodiment described above, the third embodiment of the present invention relates to a submerged arc welding method wherein log K ($\Omega^{-1}$cm$^{-1}$) at 500° C. is at least −2.0 when the electric conductivity of the slag formed by the preceding electrode is expressed in terms of K($\Omega^{-1}$cm$^{-1}$).

In connection with the first embodiment described above, the fourth embodiment of the present invention relates to a submerged arc welding method wherein a flux forming the preceding layer contains at least the three components listed below as the slag-forming agent and the total of these three components accounts for 65-90% by weight of the whole slag-forming agent;

TiO$_2$: 20-65% by weight (based on the whole flux amount);

CaF$_2$: 12-45% by weight (based on the whole flux amount); and

Al$_2$O$_3$: 10-56% by weight (based on the whole flux amount);

(with the proviso that up to 60% by weight of the whole TiO$_2$ amount may be substituted by ZrO$_2$).

In comparison with the fourth embodiment described above, the fifth embodiment of the present invention relates to submerged arc welding method wherein the flux is a sintered type flux having a bulk density of 0.6-1.5.

In comparison with the fourth embodiment described above, the sixth embodiment of the present invention relates to a submerged arc welding method wherein iron powder is contained in the flux as a component other than the slag-forming agent.

In connection with the aforementioned first embodiment, the eight embodiment of the present invention relates to a submerged arc welding method wherein one-side submerged arc welding is performed using at least two electrodes under the welding conditions listed below by the use of a subsequent electrode or electrodes without peeling off or removing a weld slag formed by a preceding electrode or electrodes after the weld slag is solidified;

groove width:

½ (thickness)≦groove width≦(thickness+diameter of subsequent wire) when thickness≦20 mm, and ½ (thickness)=groove width=thickness, when thickness>20 mm;

welding current:

800-1350 A at a preceding electrode, and 600-1200 A at the second or subsequent electrodes;

welding voltage:

30-36 V at a preceding electrode, and 37-50 V at the second or subsequent electrodes;

welding heat input:

up to 70K Joule/cm to an electrode or electrodes other than the final electrode, and up to 60K Joule/cm to the final electrode; and distance between the electrodes:

at least 500 mm.

In connection with the eight embodiment described above, the ninth embodiment of the present invention relates to a submerged arc welding method wherein all the electrodes other than the first electrode are oscillated in the direction right-angled to the weld line with a frequency of at least one reciprocation per centimeter of weld length.

In comparison with the eighth embodiment described above, the tenth embodiment of the present invention relates to a submerged arc welding method wherein only the final electrode is oscillated in the direction right-angled to the weld line with a frequency of at least one reciprocation per centimeter of weld length.

BRIEF DESCRIPTION OF THE DRAWINGS

Various other ojects, features and attendant advantages of the present invention will be more fully appreciated as the same becomes better understood from the following detailed description when considered in connection with the accompanying drawings in which like reference characters designate like or corresponding parts throughout the several views, and wherein.

DETAILED DESCRIPTION OF THE PREFERRED EMBODIMENTS

Figure 1:
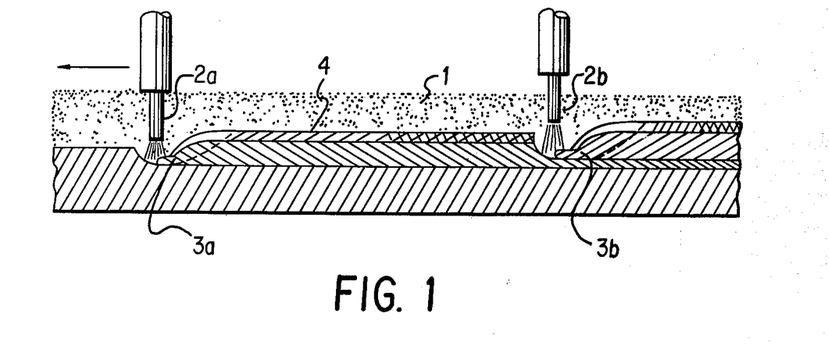
FIG. 1 is a schematic longitudinal sectional view showing the welding method in accordance with the present invention.

In accordance with the welding method of the present invention, welding is carried out in such a manner that a flux 1 is scattered on the weld line and a molten pool 3a is formed by the preceding electrode 2a while a molten pool 3b is likewise formed by the subsequent electrodes 2b from behind the preceding electrode 2a without removing the slag as shown in the schematic longitudinal sectional view of FIG. 1, for example. In this case, there is a critical relationship between the size of the heat affected zone at the weld section and the gap between the molten pool 3a and the molten pool 3b. If the gap is too narrow, the preceding weld metal is applied with the heat input of the subsequent electrode 2b before it is sufficiently cooled whereby it becomes impossible to narrow the heat affected zone (hereinafter referred to simply as HAZ). In addition, the effect of refining the coarse ferrite structure in HAZ becomes insufficient, thereby making it impossible to obtain satisfactorily low temperature toughness. On the other hand, if the gap is kept sufficiently long, the preceding weld section and the subsequent weld section are heated and cooled independently of each other so that the respective HAZs are formed independently and their heat inputs are also small. It is therefore possible in such a case to reduce HAZ in comparison with the prior art method. Moreover, since the coarse ferrite structure formed on the weld metal and on HAZ at the time of the preceding welding is refined at the subsequent welding, satisfactory results are obtained synergistically both in diminishing of HAZ and in improvement in toughness, thus providing a weld section having as a whole excellent low temperature toughness.

On the basis of the abovementioned finding, the inventors of the present invention have carried out intensive experiments in order to determined the gap (between the molten pools 3a and 3b) required for accomplishing the object of the invention and as a result, found that the gap be at least 300 mm. Though the embodiment shown in FIG. 1 uses a single electrode for each of the preceding and subsequent electrodes 2a and 2b, the abovementioned suitable gas is not affected at all by the number of electrodes used. Thus, it has been found that the suitable gap remains unchanged even when plural electrodes are used for either one or both of the preceding electrode and the subsequent electrode.

However, if the distance between electrodes is increased so as to keep the gap of at least 300 mm between the molten pools 3a and 3b, welding by the subsequent electrode is effected only after the slag 4 formed on the surface of the preceding weld section is solidified. Because the solidifed slag 4 does not generally have conductivity as mentioned already, however, no arc is generated there and welding by the subsequent electrode is not feasible. As a results of studies, however, the inventors of the present invention have found that an arc can be generated even without removing the slag 4 if proper conductivity is imparted thereto and removal of the slag 4 can be thus eliminated.

In this case, the composition and physical and electric properties of the slag 4 are determined by spray flux to be used for welding and flux of a filler contained in a composite wire or that of a filler for beveling. If adjustment is so made, therefore, that at least the slag 4 formed by the preceding welding contains 20–65% by weight of $TiO_2$, 9.6–40% by weight of $CaF_2$ and 10–56% by weight of $Al_2O_3$, generation of the arc from the subsequent electrode becomes possible even if the slag is not peeled off and removed at the time of welding of each layer. The criticality of the components for the composition of the slag 4 is as follows. First, $TiO_2$ is an indispensable component for providing the cooled and solidified slag with a proper conductivity to generate arc. If it is not more than 20% by weight in quantity, conductivity becomes insufficient and the arc from the subsequent electrode becomes unstable or is not generated at all. Moreover, floatability of the slag in the molten state also becomes inferior, thereby sometimes resulting in slag inclusion or inferior melting of the slag. On the other hand, if the amount of $TiO_2$ exceeds 65% by weight, stability of the arc becomes satisfactory. Nonetheless, fluidity of the slag becomes insufficient and the shape of the prior beads becomes inferior. Moreover, undercut tends to occur inside the beveling and the slag tends to be disadvantageously caught in this portion.

$CaF_2$ is an indispensable component for imparting a suitable melting point to the slag. If it is less than 9.6% by weight, the melting point of the slag becomes too high so that the slag becomes difficult to melt and calls for a greater heat input from the subsequent electrode. As a result, it becomes impossible to attain the object of diminishing the heat affected zone. On the other hand, if $Caf_2$ is more than 40% by weight, the slag has an unnecessarily low melting point whereby the arc becomes unstable and fails to provide appreciable beads.

$Al_2O_3$ is an essential component for furnishing the slag with a proper fluidity. If it is less than 10% by weight, fluidity of the slag becomes insufficient and the shape of beads becomes inferior. In addition, stability of the arc is disadvantageous lowered at the time of subsequent welding. On the other hand, if it exceeds 56% by weight, stability of the arc is lowered at the time of subsequent welding.

If the slag contains $TiO_2$, $CaF_2$ and $Al_2O_3$ in the respective amounts falling within the abovementioned suitable ranges, the slag has proper conductivity, proper fluidity as well as a proper melting point and enables extremely smooth welding by the subsequent electrode. Especially because the present invention uses the novel method of carrying out welding by the subsequent electrode without removing the slag formed by the preceding electrode, it is essentially necessary to provide the solidified slag with electric conductivity. For the purpose of re-fusing the slag that has once solidified and carrying out welding smoothly, meltability of the slag and fluidity of the molten slag are of utmost importance. In order to satisfy all of these three requirements, the above-mentioned ranges for the components must be set extremely strictly.

As briefly explained in the foregoing paragraph, the slag composition is determined by the spray flux to be used in the welding step, a filler for beveling, a flux contained in a composite wire and the like, and the compositions of these fluxes appear substantially as such in the composition of the slag. In order to accomplish the objects of the present invention, therefore, the compositions for components including these fluxes and fillers in total must be set so as to satisfy the abovementioned suitable ranges for components. Among these components, $CaF_2$ is partially gasified during the welding step so that it is preferred to add it in an amount slightly exceeding the set range such as from 12 to 45% by weight, for example, $ZrO_2$ is available as a material having the same effect as $TiO_2$; hence, substantially the same effect can be obtained also in the present invention by replacing up to 60% by weight of $TiO_2$ by $ZrO_2$. As a supply source of a slag-forming agent, a backing flux may be used for one-side welding in the present invention.

The present invention is constructed as briefly stated in the foregoing paragraph. In performing multiple electrode welding or multi-layer welding while keeping at least 300 mm of the gap between the molten pool formed preceeding and the molten pool formed subsequently, the present invention stipulates the composition for components of the resulting slag and thus provides the following various effects and advantages;

(1) As the method of the present invention employs the step of welding a subsequent layer after the preceding weld section is cooled to a certain extent, a heat input quantity applied temporarily to the base metal is reduced, thus enabling diminishing of the heat affected zone. Furthermore, the coarse ferrite structure formed at the preceding welding is refined by the welding heat of the subsequent layer and exhibits the synergistic effect so that it becomes possible to secure extremely excellent low temperature toughness.

(2) Since it is possible in accordance with the present method to weld a subsequent layer without peeling off and removing the slag, the welding work is markedly reduced and its efficiency is improved remarkably.

(3) Since the slag is provided with a proper meltability and fluidity, weld workability is smooth and it is possible to obtain good and beautiful weld sections free from undercut or slag inclusion in a reliable manner.

(4) Thus, it is possible to remarkably improve workability and properties of the weld section in performing the continuous welding using multiple electrodes or in performing multi-layer welding using a single electrode.

Incidentally, though $TiO_2$ enhances conductivity and floatability of the slag from the molten metal, the present invention expects specifically the former function.

Figure 2:
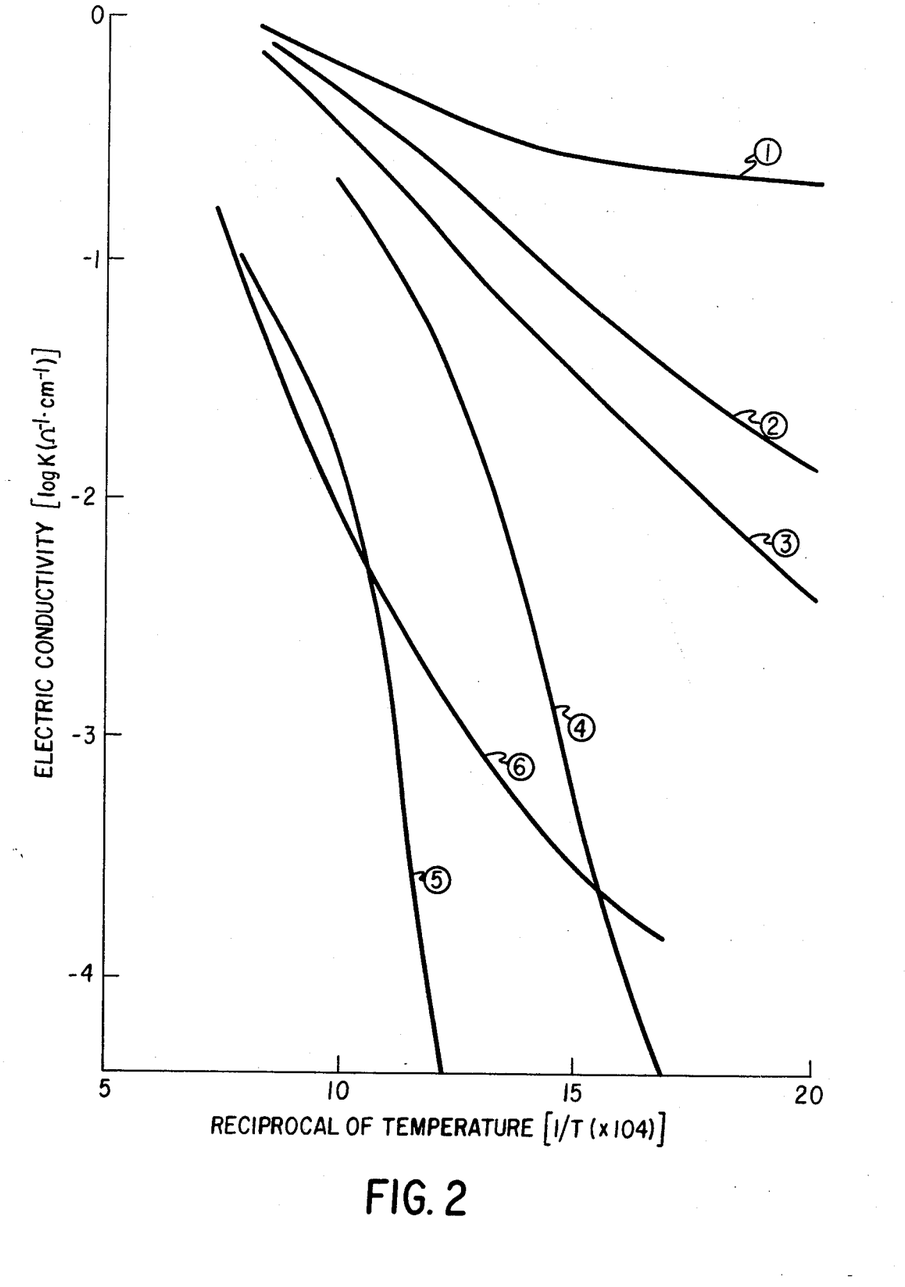
FIG. 2 is a diagram showing the relation between the slag temperature and the electric resistance.

FIG. 2 is a diagram showing the slag temperature-vs-slag conductivity curve when the flux of the present invention and the conventional flux are used, respectively, wherein the flux of each of the curves indicated by numerals 1 through 6 in the diagram contains the following $TiO_2$ (versus total flux amount) and the slag-forming agent for each slag is also listed below;

1. 40% by weight ($TiO_2$—$CaF_2$—$Al_2O_3$ system)
2. 35% by weight ($TiO_2$—$CaF_2$—$Al_2O_3$ system)
3. 15% by weight ($TiO_2$—$CaF_2$—$Al_2O_3$ system)
4. 8% by weight ($SiO_2$—$MnO$—$CaO$ system)
5. 0.2% by weight ($SiO_2$—$CaO$—$MgO$ system)
6. 0% by weight ($SiO_2$—$Al_2O_3$—$MgO$ system)

In FIG. 2, $logK(\Omega^{-1}cm^{-1})$ is plotted on the ordinate and a reciprocal value of temperature on the abscissa when electric conductivity is expressed in terms of $K(\Omega^{-1}cm^{-1})$. Hence, the conductivity becomes lower towards the point of intersection of the ordinate whereas the temperature becomes higher toward that of the abscissa.

As can be seen from FIG. 2, the electric conductivity generally tends to be lower along with decrease in the slag temperature. However, a remarkable feature lies in that the conductivity becomes as much higher when the $TiO_2$ content increases, thereby clarifying the effectiveness of $TiO_2$. Accordingly, an examination is made to determine which extent of conductivity practically enables the generation of arc at a small heat input quantity. Thus, it has been found that the objects of the present invention can be accomplished sufficiently if such a flux is used as a guidline that can provide a slag having $logK(\Omega^{-1}cm^{-1})$ of at least $-2.0$ at 500° C.; though the value may vary to some extent depending on the method of measurement. When the $TiO_2$ content providing such conductivity is determined, it has been found that at least 20% by weight, based on the total flux amount, of $TiO_2$ is necessary. Hence, this value is used as the lower limit. As far as the conductivity is concerned, there is no need to set the upper limit. However, if the $TiO_2$ content exceeds 65% by weight, viscosity of the molten slag lowers and deteriorates the original function of the slag. It is for this reason that the upper limit is set to 65% by weight (on the total flux amount).

Figure 3:
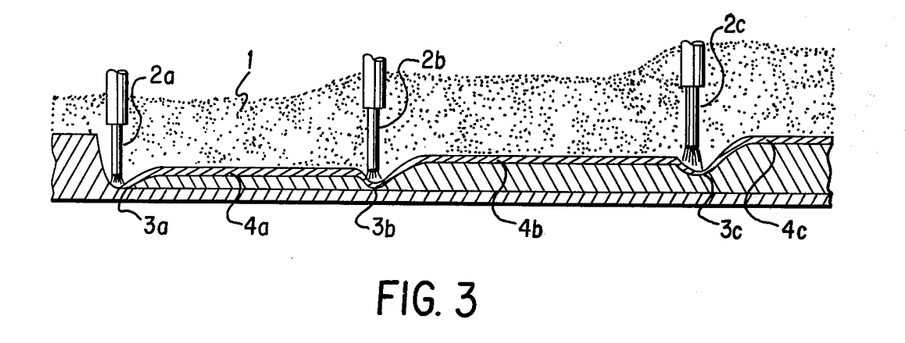
FIG. 3 is a schematic longitudinal sectional view showing another welding method in accordance with the present invention.

Multiple electrode welding using three or more electrodes can be made in the same way as two-electrode welding shown in FIG. 1. Namely, as shown in FIG. 3, the molten pool 3a is formed by the first electrode 2a and, without removing the resulting slag 4a, an arc is then generated by the second electrode 2b from behind the former on the groove surface to thereby again melt the slag 4a. From behind the second electrode, further, the resulting slag 4b is again melted by generating an arc on the groove wall from the third electrode 2c to thereby form the molten pool 3c. Welding is continued in this manner. In this case, there is a critical relationship between the gap of these electrodes and the size of HAZ at the weld bond of joint and the coarsening of the crystal structure. If the electrode gap is too narrow, heat input is applied to the preceeding weld from the subsequent electrode before it is sufficiently cooled. In such a case, satisfactory low temperature thougness can not be obtained not only because HAZ can not be obtained not only because HAZ can not be narrowed but also because the effect of the subsequent electrode for refining the coarse ferrite structure of HAZ by the preceding electrode becomes weaker.

Figure 4:
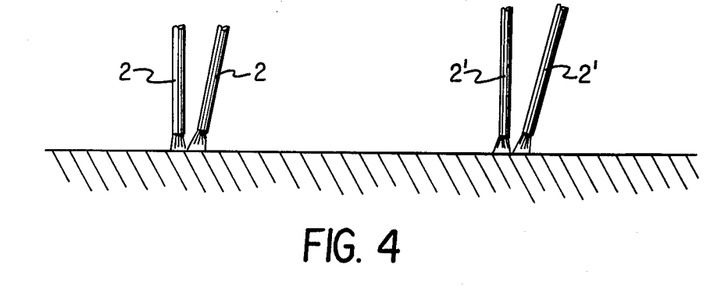
FIG. 4 is a schematic view showing still another welding method in accordance with the present invention.

Accordingly, the inventors of the present invention have determined experimentally the conditions which enable one to accomplish simultaneously diminishing of HAZ and refining of the crystal structure and have now found that it is preferable to initiate the welding by the subsequent electrode when the preceding weld metal is cooled down to at least 500° C. and for this purpose, to keep the distance of at least 500 mm between these electrodes. Incidentally, though FIGS. 1 and 2 show the embodiments wherein the preceding and subsequent electrodes or the first, second and third electrodes all use a single electrode, exactly the same effect can be obtained when each of these electrodes uses a plurality of electrodes, respectively, as shown in FIG. 4.

Figure 5:
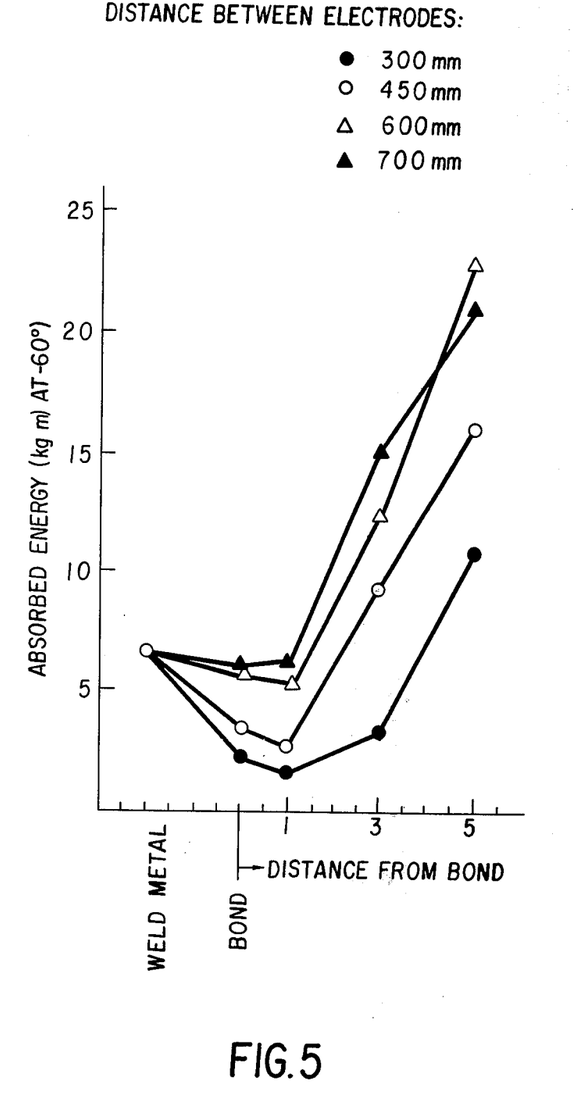
FIG. 5 is a diagram showing the relation between the position of weld bond and the low temperature toughness when the distance between electrodes is changed.

For, example, FIG. 5 is a diagram showing the relationship between the electrodes gap and the toughness of HAZ when a two-electrode one-side submerged arc welding method is employed. As is obvious from the results shown, whereas the impact property lowers extremely at a position 1 mm distant from the weld bond when the electrode gap is smaller than 450 mm, the impact strength hardly lowers when the electrode gap is at least 500 mm. However, the electrode gap is stipulated to primarily disperse the welding heat input as mentioned already and hence, the optimum electrode gap varies considerably depending on the cooling speed of the weld metal. The thicker the material to be weld, for example, the faster the cooling speed of the weld metal. Though the electrode gap of about 500 mm is sufficient for welding of a material of a thickness of about 16 mm, it is desired to widen the electrode gap up to about 700 mm when the thickness is as small as about 12 mm because the cooling speed becomes considerably slow. When the thickness becomes as thick as about 19 mm, the cooling speed itself of the weld metal becomes faster. However, since the welding heat input also becomes greater, the optimum electrode gap is about 600 mm. Though the present invention stipulates the electrode gap to be at least 500 mm as a guideline, it is desired to determine the optimum electrode gap every time depending upon the thickness of the base metal, the welding conditions and other factors.

If the electrode distance is widened to exceed 500 mm, welding by the subsequent electrode is effected after the slag formed on the surface of the preceding weld metal is solidified and cooled to a certain extent so that weldability by the subsequent electrodes is deteriorated markedly due to the presence of the solidified slag.

However, welding can be made smoothly in this case without removing the solidified slag by setting the welding current, welding voltage and welding heat input to the preceding and subsequent electrodes in the respective ranges to be described later and by setting the groove width also in the later-appearing range.

Initially, explanation hereinbelow will be given on the welding current and voltage.

In effecting the welding by the foremost electrode, a satisfactory penetration bead must be formed initially. In other words, in the conventional multiple electrode submerged arc welding, the number of molten pools is, after all, only one so that the welding condition by the subsequent electrodes somehow affects the formation of the penetration bead. In the method of the present invention, however, welding by the subsequent electrode is effected only after the preceding weld metal is solidified and cooled to a certain extent as described previously. In order to form a suitable penetration bead, therefore, it is sufficient to set suitable welding conditions for the welding only by the foremost electrode. From this aspect an examination is made to determine the optimum welding current and voltage to the foremost electrode. As a result, it has been confirmed that the most preferred range is from 800–1350 A for the welding current and from 30–36 V for the welding voltage, though varying to some extent depending on the thickness of the base metal, the length of the groove root and the like.

If the welding current is no more than 800 A, the arc force is too weak to provide a satisfactory penetration bead. If it exceeds 1350 A, on the other hand, HAZ and the zone of coarse crystal grains become so wide that these zones are not sufficiently caused to disappear even when imparted with reheating by the subsequent electrode, thereby inhibiting secure sufficient low temperature toughness. If the welding voltage is below 30 V, the arc tends to cause short-circuit whereby a sufficient bead width can not be obtained and undercut tends to occur frequently. If the welding voltage exceeds 36 V, on the other hand, the width of the penetration bead becomes too wide or unevenness tends to occur on the penetration bead disadvantageously.

Figure 6:
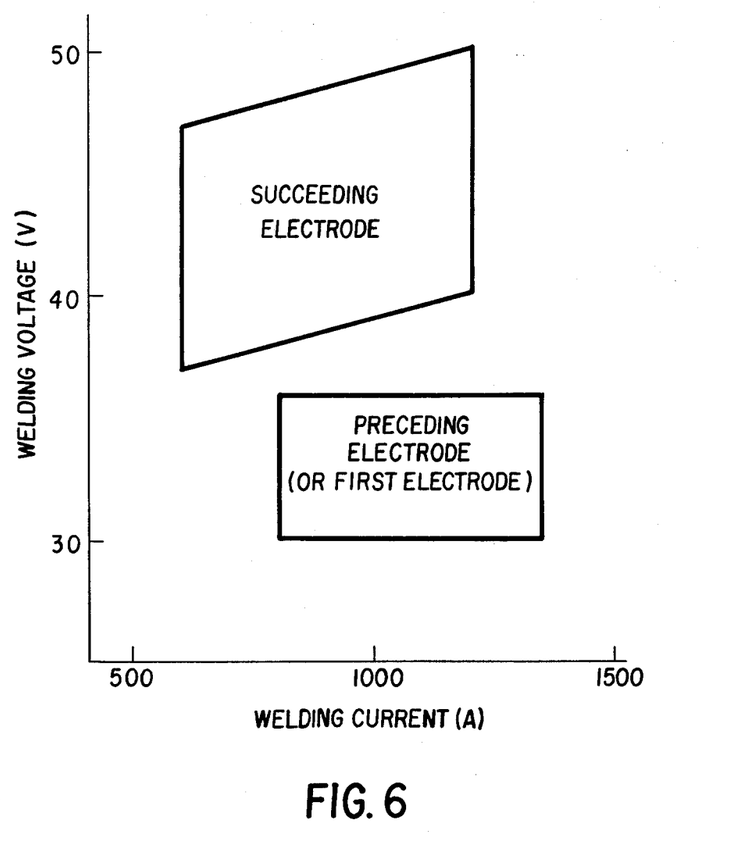
FIG. 6 is a diagram showing the proper range of the welding current and the welding voltage of a preceding electrode (or a first electrode) and subsequent electrodes (second or subsequent electrodes)

Next, explanation will be given on the welding current and voltage to the second or subsequent electrodes in the two-electrode welding or in the multiple electrode welding. In performing the welding by these electrodes, it is necessary to refine effectively the coarse ferrite structure of HAZ resulting from the heat input from the preceding electrode and to minimize and restrain as much as possible the formation of HAZ due to their own heat input. Furthermore, it is also necessary to stably generate and maintain the arc without removing the slag on the surface of the preceding weld metal. As a result of examination in search for the conditions satisfying these requirements, it has been confirmed that the welding current should be in the range of 600–1200 A and the welding voltage in the range of 87–50 V. If the welding current is below 600 A, remelting of the solidified slag becomes insufficient and the arc becomes extremely unstable. If it exceeds 1200 A, on the other hand, HAZ is caused to expand, thereby deteriorating the low temperature toughness. If the welding voltage in this instance is below 37 V, the arc is inhibited by the solidified slag and becomes extremely unstable. On the other hand, if it exceeds 50 V, blow-up of the arc or slag inclusion tends to occur during welding, thereby lowering markedly the workability. The allowable range of the welding condition for each electrode is illustrated in the diagram of FIG. 6.

In the method of the present invention, welding is carried out while generating the arc on the side wall or the surface of the groove and welding can be stabilized when the arc is easier to spread. For this reason, an alternating current power supply is preferable as a welding power source.

Next, explanation will be given as to the heat input to each electrode.

In the case of two-electrode welding, the welding heat input Q expressed by the following equation should be kept below 60 KJ/cm;

$$Q = 60\ IE/V$$

where
Q is welding heat input,
I is current,
E is voltage, and
V is welding spedd.

If the welding heat input Q exceeds 60 KJ/cm, HAZ expands and reduces the low temperature toughness.

In the multiple electrode welding using three or more electrodes, the weld heating input to the electrodes other than the final electrode is below 70 KJ/cm but the welding heat input to the final electrode is preferably considerably lower than the above-mentioned value, such as below 60 KJ/cm, for example, HAZ (or the zone of the coarse ferrite structure) formed by the heat input from the electrodes other than the final electrodes is sequentially heated again by the subsequent electrode to thereby refine the crystal grains and consequently, a relatively high welding heat input may be employed. However, HAZ resulting from the final electrode can no longer result in a crystal refining effect by the subsequent electrode and it is necessary to minimize HAZ due to its own heat input. For this reason, it is necessary to restrain the welding heat input to be considerably low at the final electrode portion.

As mentioned above, welding must be performed in the method of the present invention while the welding current, the welding voltage and the welding heat input to each electrode must be stipulated in the proper range and the gap between the electrodes must also fall within the specific range. In addition to these requirements, the groove width must also be set properly in accordance with the thickness of the base metal in the present invention. Namely, when the thickness of the base metal as below 20 mm;

$\frac{1}{2}$(thickness $\leq$ groove width $\leq$ (thickness + diameter of subsequent wire), and when the thickness of the base metal exceeds 20 mm;

$\frac{1}{2}$(thickness $\leq$ groove width $\leq$ thickness.

Figure 7:
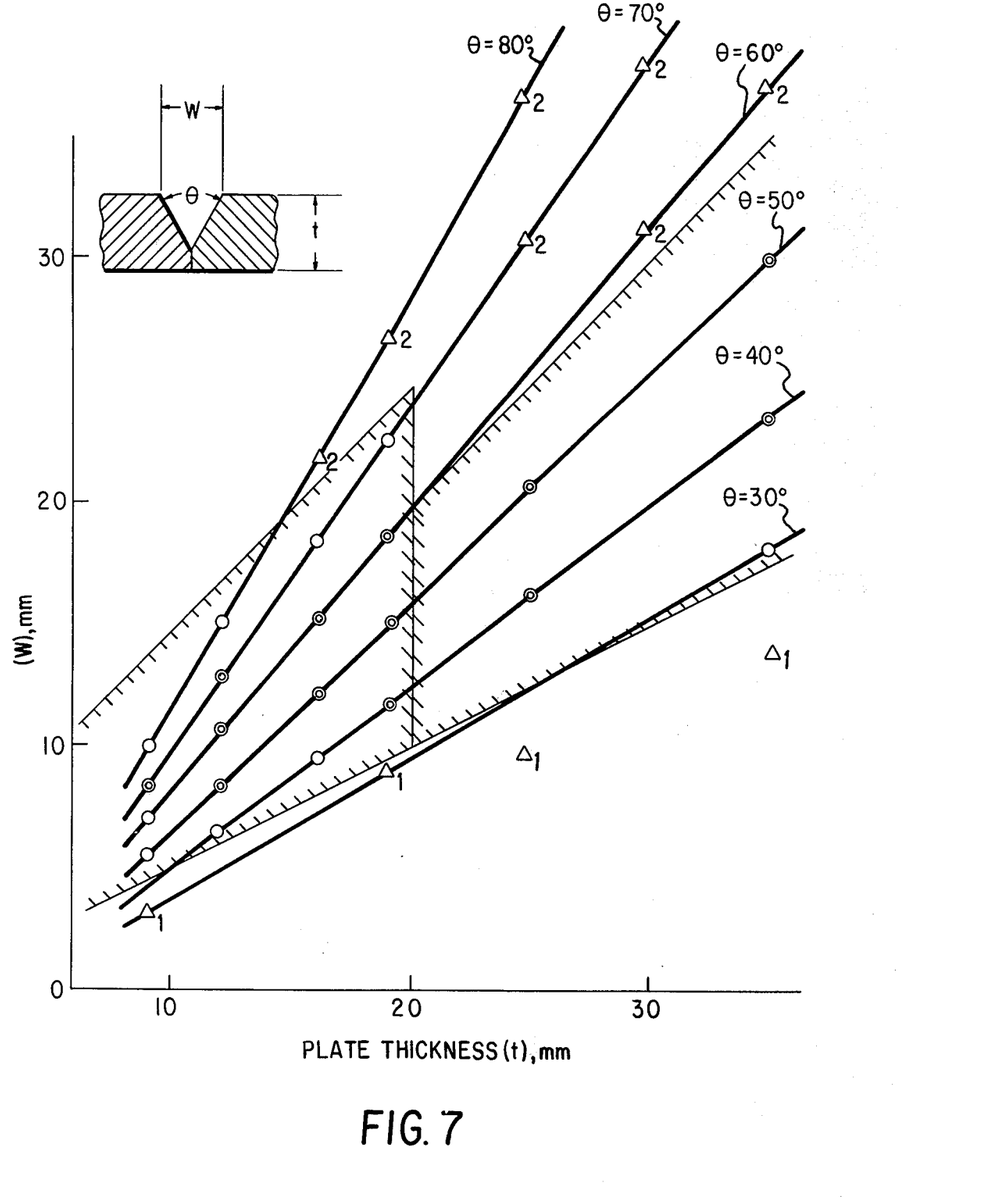
FIG. 7 is a diagram showing the relationship between the thickness of base metal and the groove width in order to obtain suitable weldability.

The criticality of these restrictions can be seen from the experimental results shown in FIG. 7. Namely, FIG. 7 shows the results of observation of the one-side, two-electrode, submerged arc welding applied to the base metal under the beveling state shown at the upper left-hand corner by changing variously the thickness t of the base metal, the groove width W and the groove angle $\theta$. The symbol ⊚ represents that both weld workability and property of the weld bond are extremely good; O represents that they are fair; $A_1$ represents that the penetration bead is difficultly formed and the arc from the subsequent electrodes is extremely unstable and $A_2$ represents that HAZ increases to thereby decrease the low temperature toughness and undercut occurs on the front bead which leads to the defective weld.

As is obvious from these results, the relation between the groove width and the thickness starts changing with the thickness of 20 mm being its boundary. However, so long as the groove width satisfies the above-mentioned relations, it is possible to always secure excellent weld workability and excellent performance of the weld bond of the joint.

In the method of the present invention, it is possible to secure excellent weldability and excellent performance of the weld bond of joint even by moving each electrode straight in the direction of the weld line if all the aforementioned requirements are satisfied. In order to further enhance these effects and to obtain a beautiful finish of the front bead, it is extremely effective in the present invention to carry out the welding whil oscillating the rearmost electrode (the second electrode in the case of the two-electrode welding) in the direction of width. Namely, the welding step by the rearmost electrode most remarkably affects the shaping of the front bead. During this step, the following are therefore requisites;

1. The solidified slag on the preceding and subsequent weld lines must be re-melted uniformly.
2. The slag inclusion must be prevented.
3. Undercut, etc. must be prevented accurately.

It has been found that all these requirements are met extremely effectively by oscillating the rearmost electrode. As mentioned already, however, the welding heat input to the rearmost electrode should be kept considerably lower in comparison with the other electrodes in order to diminish HAZ. If the rearmost electrode is oscillated in the direction of width, however, the welding heat input can be dispersed uniformly in the direction of width of the weld line whereby it becomes possible to minimize HAZ without deteriorating weldability. This has also been found extremely desirable for the purpose of enhancing the low temperature toughness of the weld bond of joint.

Figure 8:
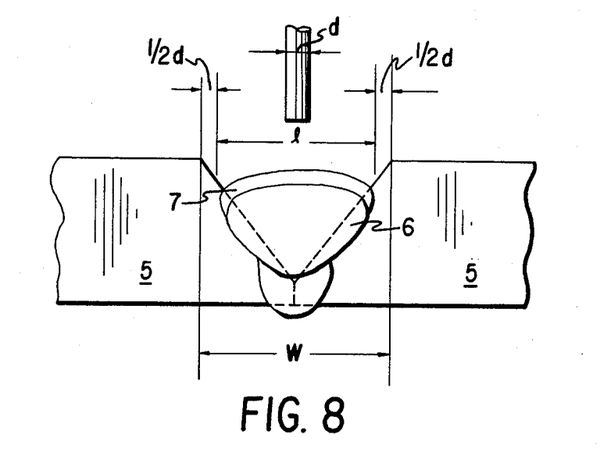
FIG. 8 is a schematic view showing the way to decide the oscillation width.

In conjunction with this point, the following are the results of examination made by the inventors of the present invention to determine the optimum oscillation width and speed. As to the oscillation width, initially, reference is to be made to FIG. 8 which is a sectional view of the beveling wherein W is the groove width, 1 is the oscillation width and d is the diameter of the electrode. (Reference numerals 5, 5 represent the base metal, 6 is the preceeding weld metal and 7 is the slag.) In order to reliably prevent the undercut or the slag inclusion, it is preferred to make the oscillation width 1 considerably smaller than the groove width W. Considering the expansion of the arc from the electrode, furthermore, it is most preferred that oscillation is made within the range of about a half of the diameter d of the electrode rather than on both side edges of the groove. From this, the most optimum oscillation width 1 has been confirmed to be a value obtained by deducting the diameter d of the electrode ($=\frac{1}{2}d + \frac{1}{2}d$) from the groove width W.

Figure 9A:
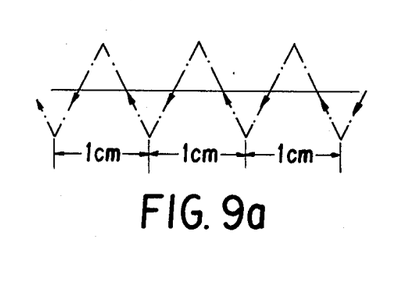
FIG. 9a, FIG. 9b, FIG. 9c and FIG. 9d exemplify oscillation patterns of the present invention.
Figure 9B:
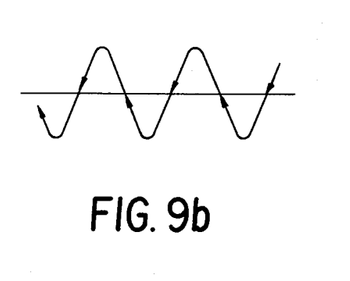
Figure 9C:
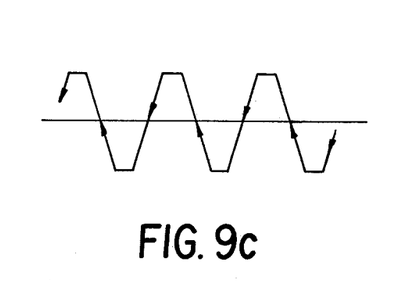
Figure 9D:
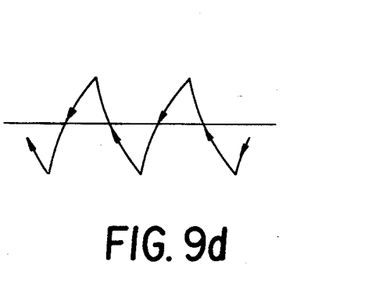

As to the oscillation frequency, secondly, it is desired that oscillation is made at least once or 1.5 times per centimeter of the length of the weld in order to exhibit the effect of oscillation to the maximum possible extent (especially to disperse the welding heat input uniformly in the direction of width of the weld line). The oscillation pattern in this case is most commonly such as shown in FIGS. 9a and 9b, but there is no specific limitation to the pattern of oscillation itself. Hence, optional oscillation patterns such as shown in FIGS. 9c and 9d, for example, may also be used.

Though the foregoing explanation deals with the case wherein only the rearmost electrode is oscillated, the other electrodes may also be oscillated for the same purpose. Such also is embraced naturally in the scope of the present invention.

The present invention has the construction as described in the foregoing paragraphs. In brief, in performing one side, submerged arc welding using multiple electrodes, the present invention sets the groove width within a predetermined range in accordance with the thickness of the base metal, stipulates also the welding current, the welding voltage and the welding heat input to each electrode and keeps the distance of the gap between the electrodes to exceed a specific length in order to enable smooth welding without removing the solidified slag on the surface of the preceding weld metal. Along with elimination of the slag removing work, the present invention enables drastic enhancement of the weld workability. In the present invention, welding of the subsequent layer is made after the weld metal formed precedingly is cooled to a certain extent whereby the welding heat input is dispersed uniformly and HAZ can be thus narrowed. Furthermore, since the coarse ferrite structure of this HAZ portion is reheated by the welding heat input from the subsequent electrode, the crystal grains can be refined. In comparison with the conventional multiple electrode submerged arc welding method, therefore, the method of the present invention provides the characteristic feature that the low temperature toughness can be improved drastically at the weld bond of the joint. Hence, the present invention has extremely high utility in various fields of welding.

Obviously, many modifications and variations of the present invention are possible in light of the above teachings. It is therefore to be understood that within the scope of the appended claims the invention may be practiced otherwise than as specifically described herein.

What is claimed as new and desired to be secured by Letters Patent of the United States is:

1. A multiple electrode welding method which comprises:
    arranging a plurality of electrodes in such a manner that the distance is at least 300 mm between a first molten pool formed by multilayer welding by a single or a plurality of electrodes preceding along a weld line and a subsequent molten pool formed by a single subsequent electrode or plurality of subsequent electrodes;
    forming slag having a composition which comprises:
    $TiO_2$: 20–65% by weight
    $CaF_2$: 9.6–40% by weight, and
    $Al_2O_3$: 10–56% by weight
    on weld metal formed by an electrode or a preceding electrode forming a preceding layer, and
    welding along said weld line, without removing said slag, using said single subsequent electrode or said subsequent plurality of electrodes for forming said subsequent molten pool layer.

2. The submerged arc welding method as defined in claim 1 wherein the total of said composition of $TiO_2$, $CaF_2$ and $Al_2O_3$, comprises 60–90% by weight of the whole slag-forming agent.

3. The submerged arc welding method as defined in claim 1 wherein $logK(\Omega^{-1}cm^{-1})$ at 500° C. is at least $-0.2$ when electric conductivity of the slag formed by the preceding electrode is expressed in terms of $K(\Omega^{-1}cm^{-1})$.

4. The submerged arc welding method as defined in claim 1 which further comprises forming a preceding layer of flux having a composition which comprises:

$TiO_2$: 20–65% by weight (based on the whole flux amount), $CaF_2$: 12–45% by weight (based on the whole flux amount), and $Al_2O_3$: 10–56% by weight (based on the whole flux amount), as a slag-forming agent and the total of said composition comprises 65–90% by weight of the whole slag-forming agent.

5. The submerged arc welding method as defined in claim 4 wherein said flux comprises a sintered type flux having a bulk density of 0.6–1.5.

6. The submerged arc welding method as defined in claim 4 wherein said flux comprises a molten type flux having a bulk density of 0.6–1.7.

7. The submerged arc welding method as defined in claim 4 wherein said flux includes iron powder as a component other than the slag-forming agent.

8. The submerged arc welding method as defined in claim 1 which further comprises:

performing one-side, submerged arc welding using at least two electrodes under the welding conditions:

groove width:

$\frac{1}{2}$ (thickness) $\leq$ groove width $\leq$ (thickness + diameter of subsequent wire) and thickiness $\leq$ 20 mm, and $\frac{1}{2}$ (thickness) $\leq$ groove width $\leq$ thickness when thickness $\leq$ 20 mm;

welding current:

800–1350A at a preceding electrode, and 600–1200A at a second or subsequent electrodes;

welding voltage:

30–36V at a preceding electrode, and 37–50V at said second or subsequent electrodes;

welding heat input:

up to 70K Joule/cm to an electrode or electrodes other than a final electrode, and up to 60K Joule/cm to said final electrode; and distance between the electrodes:

at least 500 mm and;

using said subsequent electrodes without peeling off and removing a weld slag formed by a preceding electrode or electrodes after the weld slag is solidified.

9. The submerged arc welding method as defined in claim 8 which further comprises oscillating all electrodes other than a first electrode in a direction at right-angles to the weld line with a frequency of at least one reciprocation per centimeter of weld length.

10. The submerged arc welding method as defined in claim 8 which further comprises oscillating only the final electrode in a direction at a right angle to the weld line with a frequency of at least one reciprocation per centimeter weld length.

11. The submerged arc welding method as defined in claim 1 or 4 which further comprises substituting $ZrO_2$ for up to 60% by weight of said 20–65% by weight of $TiO_2$.

* * * * *